United States Patent [19]

Herrell et al.

[11] Patent Number: 5,325,493

[45] Date of Patent: Jun. 28, 1994

[54] SYSTEM FOR DISTRIBUTING COMMAND/DATA PACKETS TAGGED BY THEIR UNIT IDENTIFIER FOR PARALLEL PROCESSING BY A READY PROCESSING UNIT AND RECOMBINATION

[75] Inventors: Russ W. Herrell; Theodore G. Rossin; Bradley W. Cain, all of Fort Collins; Eric C. Nelson, Loveland, all of Colo.

[73] Assignee: Hewlett-Packard Company, Palo Alto, Calif.

[21] Appl. No.: 41,298

[22] Filed: Mar. 30, 1993

Related U.S. Application Data

[63] Continuation of Ser. No. 492,516, Mar. 12, 1990, abandoned.

[51] Int. Cl.⁵ .......................... G06F 7/10; G06F 15/80
[52] U.S. Cl. ................................. 395/375; 395/650; 395/700; 364/DIG. 1; 364/230; 364/230.2; 364/229.2; 364/229.4; 364/261.3; 364/280
[58] Field of Search ............... 395/375, 650, 800

[56] References Cited

U.S. PATENT DOCUMENTS

| | | | |
|---|---|---|---|
| 4,321,666 | 3/1982 | Tasar et al. | 364/200 |
| 4,644,461 | 3/1987 | Jennings | 364/200 |
| 4,853,877 | 8/1989 | Parkhurst et al. | 364/520 |
| 4,885,703 | 12/1989 | Deering | 364/522 |
| 4,918,689 | 4/1990 | Hui | 370/85.9 |
| 4,922,486 | 5/1990 | Lioinsky et al. | 370/60 |
| 4,949,280 | 8/1990 | Littlefield | 364/518 |
| 4,980,824 | 12/1990 | Tulpule et al. | 395/650 |
| 5,010,515 | 4/1991 | Torborg, Jr. | 364/900 |
| 5,050,070 | 9/1991 | Chastain et al. | 395/375 |
| 5,067,069 | 11/1991 | Fite et al. | 395/375 |
| 5,226,126 | 7/1993 | McFarland et al. | 395/375 |

OTHER PUBLICATIONS

"A Parallel Processor Architecture for Graphics Arithmetic Operations", J. Torborg, Computer Graphics vol. 21, No. 4, Jul. 1987, pp. 197-204.

*Primary Examiner*—Thomas C. Lee
*Assistant Examiner*—Wayne Amsbury

[57] ABSTRACT

A device for distributing a serial stream of commands and associated data to a parallel array of processing units so that the data processed by the parallel processing units can be recombined in the original order in which the serial stream was received. The command distributor of the invention hands out commands to the parallel processing units using a true "first come, first serve" algorithm using fast bus arbitration hardware. Each parallel processing unit requests data to be input when all of its data has been processed, and bus arbitration is used to prevent conflict when a plurality of requests are received. The ID of the processor to which a command is assigned is used in recombining the processed data into a serial data stream having the same order as the original. Means are also provided by which single commands which require considerable processing may be executed in parallel on more than one of the processors, with each portion of the result coming from a different processor, yet maintaining the sequentiality of the output data stream. Processing speed is further enhanced by broadcasting global commands to all processors at once.

57 Claims, 5 Drawing Sheets

ALGORITHM FOR S/P COMMAND DISTRIBUTOR 20

ALGORITHM FOR CONCATENATOR

SYSTEM FOR DISTRIBUTING COMMAND/DATA PACKETS TAGGED BY THEIR UNIT IDENTIFIER FOR PARALLEL PROCESSING BY A READY PROCESSING UNIT AND RECOMBINATION

This is a continuation of copending U.S. patent application Ser. No. 07/492,516 filed on Mar. 12, 1990, now abandoned.

BACKGROUND OF THE INVENTION

1. Field of the Invention

The present invention relates to a method and apparatus for distributing serial instruction stream data to parallel processors, and more particularly, to a method and apparatus for distributing a serial stream of command-/data packets among a parallel array of processors for processing so that the data processing outputs of the processors can be readily recombined into a serial stream with the same ordering as the original stream.

2. Description of the Prior Art

It is well known to use a plurality of processing units in parallel to improve processing speed. For example, for applications such as interactive 3-D graphics which require significant arithmetic processing in order to handle complex models, parallel processing units have been used for several years in order to improve processing efficiency. For such processing efficiency to be realized, a mechanism has been necessary for optimally allocating the input sequential data to the parallel processing units. Also, when the original data ordering is to be maintained, a mechanism has been necessary for reading the outputs from each of the parallel processing units and resequencing the processed data so that it has the same order as the original data stream. However, such prior art mechanisms have had only limited success.

For example, one technique in the prior art for allocating sequential input data to a plurality of parallel processing units has been to assign one parallel processing unit as a master while the other processing units operate as slaves. The master passes out commands to the slaves generally in accordance with an adaptive load balancing algorithm in which master selects a slave which has the least amount of work buffered up to become the next processing unit to receive input. If all slaves are completely out of input buffer space, then the master becomes the active processing unit. The master will remain the active processing unit until a slave has available input buffer space and a minimum number of commands have been executed. The minimum size of the master's block of commands, along with the size of the blocks of commands given to the slaves, may be adjusted to improve processing efficiency. In addition, in order to ensure that the processed data may be resequenced after processing in the assigned processing unit, the master may write to a RAM FIFO a value identifying the slave processing unit to which a particular command has been assigned. The order of the writes into the RAM FIFO enables the master to maintain the same rendering order as the order that the commands were originally received at the master's input buffer.

However, such a technique has the disadvantage that all of the processing units cannot be identical and programmed identically, thereby increasing the costs and complexity of the system. Moreover, if one or more of the slave processing units are kept busy with a complex data processing command, the benefits of parallel processing may be soon lost.

Another technique in the prior art for allocating sequential input data to a plurality of parallel processing units has been described, for example, by Torborg in "A Parallel Processor Architecture for Graphics and Arithmetic Operations", Proceedings of SIGGRAPH, Volume 21, Number 4, July 1987. Therein describes a graphics processor architecture having an arbitrary number of identical processors operating in parallel which are programmed identically as if each processor were a single processor system. In particular, Torborg discloses that parallel processing in up to eight arithmetic processors may be used for front end geometric and arithmetic operations to improve processing time for an interactive 3-D graphics system. Torborg also observes that the graphics commands must be adequately distributed among the processors for efficient processor utilization and that the multiple parallel processors must produce the same apparent results as a single processor performing the same operations.

For implementing his system, Torborg observes that many graphics commands are order-independent and hence their processing and rendering order may be changed without affecting the display. However, for those graphics commands which are not order-independent, Torborg proposes to delay the processors which are processing other commands until all processors are synchronized before processing the sequential command. Torborg indicates that due to the buffering of the processor output that this synchronization has a minimal effect on processing efficiency.

Torborg further proposes to transfer pipelined data to the parallel arithmetic processors whenever data is available and the appropriate arithmetic processor is ready for data. The graphics commands are distributed to the arithmetic processors depending upon whether the inputted command is a global command which is to be sent to all arithmetic processors, a command which is sent to the arithmetic processor most ready to accept the command as determined by a command arbitration mechanism, or a command which is to be sent to a specific arithmetic processor as specified within the graphics command. Command arbitration is used to determine which arithmetic processor should receive the command if it can be processed in parallel. The arbitration mechanism attempts to fairly distribute commands between processors in order to improve processing efficiency by giving priority to processors which will be ready to accept the command soonest. For this purpose, Torborg discloses that each processor may have a command input buffer which is used to buffer commands from a display list manager. The buffer is deep enough that it can contain several commands simultaneously, and the commands may be requested on different priority levels depending upon the amount of data in its input buffer. Distribution priority is then given to the processors executing the commands which take the least amount of time to process.

Sequencing is generally maintained in the system of Torborg by maintaining a small tag FIFO in each processor for keeping track of the ordering of all sequential commands being processed by all arithmetic processors and all commands being processed by the particular processor containing the tag FIFO. A two bit entry in the tag FIFO is used by Torborg to indicate whether the command is being processed by the particular arithmetic processor containing the tag FIFO and whether the command is a sequential command. The output of the tag FIFO is used to insure sequential processing of all order dependent commands and to control the order in which the processed data is transferred to an image memory unit for subsequent display. In particular, the output of the tag FIFO is used to control arbitration on the bus by which the parallel graphics processing units are connected to the image memory unit. For example, if the two control bits of the tag FIFO indicate that the command is not sequential, then the output controller will request the bus as soon as a complete command block is available. In this case, the order in which commands are transferred to the image memory unit will depend on the processor load and command distribution of all processors. The tag FIFO output will be clocked after each command group associated with a single graphics input command is transferred over the bus to the image memory unit.

However, if the tag FIFO indicates a sequential command, the output controller will wait until all other arithmetic processor output controllers have reached the same point in the original command stream for purposes of synchonization. In order words, the output controller will wait until all arithmetic processors reach the entry in their tag FIFOs corresponding to a particular sequential command, thereby synchronizing the arithmetic processors, before the sequential command is output for processing. Since every processor in the system of Torborg places an entry into its tag FIFO for every sequential command (even if the command is not executed by that processor), all processors' tag FIFOs will indicate a sequential command but only one will indicate that the command was processed by that processor. The processor which has processed the sequential command will then request the bus and send the group of commands associated with the graphics input command to the image memory unit. Once this command transfer has completed, the tag FIFO output on all arithmetic processors will be clocked. As noted above, Torborg indicates that processing efficiency is maintained in this system since the processor core can still continue to transfer commands into the output FIFO of the processors while the output controller synchronizes all of the processors to maintain sequentiality.

Thus, in the system of Torborg, a mechanism is provided for assigning sequential commands to a plurality of parallel processors and then recombining the processed outputs into the original ordering using values stored in a tag FIFO for output bus arbitration. However, the tag values must be maintained for each processor independently, and sequentiality must be maintained by synchronizing the outputs of all processors when a sequential instruction is received. As a result, processing efficiency can become quite low, especially when several sequential instructions are received in succession. Moreover, the command stream cannot be reordered to allow maximum use of parallel processing capabilities. Thus, when a complex input graphics primitive such as B-spline patches having a potentially long execution time compared with their input buffer size are received, processing inefficiency may be compounded.

Accordingly, there is a long-felt need for a command distributor which can distribute serial instruction stream data commands to identical parallel processing units for processing so that the processed data can be recombined so as to maintain sequentiality without synchronizing all processors for each sequential command, with the resultant loss in processing efficiency. Moreover, there is a long-felt need for a command distributor which may split complicated commands for distribution to a plurality of parallel processors for processing without destroying the sequentiality of the output data stream. The present invention has been designed for these purposes.

SUMMARY OF THE INVENTION

The above-mentioned long-felt needs have been met in accordance with the present invention, which relates to a hardware distributor which distributes serial instruction stream data to a plurality of parallel processing units on a true "first come, first served" basis using fast bus arbitration hardware. No complex processor is required to parse commands and implement load balancing algorithms as in the prior art. In addition, the present invention enables the entire command stream to be recombined in the proper order after processing and also allows single commands which require considerable processing to be executed in parallel on all the processors, with each portion of the result coming from a different processor, without destroying the order during resequencing. Moreover, since synchronization is not necessary, global commands may be sent when the first processor is ready for more work instead of waiting until all processors are ready. The system of the invention thus allows for substantially improved processing efficiency.

In accordance with the invention, a device is provided for distributing a serial stream of data processing commands and associated data to one or more parallel processing units for processing. The processed data may also be subsequently recombined into a serial processed data stream. The data distribution device in accordance with the invention includes means for providing the serial instruction stream of data processing commands and associated data as well as means for indicating whether any one of the processing units can accept any input for processing. Means are also provided for selecting, for each command in the serial stream of data processing commands and associated data, a data processing unit as the processing unit for processing each respective command provided by the providing means, where the selected processing unit is a processing unit indicated by the indicating means as capable of accepting input data for processing. In addition, means are provided for recording a processing unit identification value indicating the processing unit by which each respective command from the providing means is assigned for processing. Means may also be provided for combining the processed data from the data processing units into the serial processed data stream by sequentially reading an output of each of the data processing units in an order specified by the respective processing unit identification values stored in the recording means.

The distributing device in accordance with the invention is preferably used for distributing command/data packets of graphics commands and graphics primitives to a plurality of graphics processing units so as to allow improved processing efficiency for interactive 3-D graphics applications. However, as would be apparent to one skilled in the art, the distributing technique in accordance with the invention may be applied in numerous other processing environments where parallel processing techniques are utilized.

In a preferred embodiment, each processor incorporates a "greedy" algorithm in which input is requested on a true "first come, first served" basis. Such an algorithm is implemented by providing an input FIFO for each processing unit for queueing command/data packets to be processed by the associated processing unit and generating a processor "ready" signal when a processing unit attempts to read in a command/data packet from its input FIFO but the input FIFO is substantially empty. On the other hand, a processor "ready" signal may be generated in accordance with the invention when a processing unit indicates that its processing is substantially completed and its input FIFO is substantially empty.

In accordance with another preferred embodiment of the invention, the selecting means determines the type of command of the next command/data packet in the source FIFO, the number of processors by which the next command is to be processed and whether the indicating means indicates that a processing unit can accept input data for processing and then enables input lines of at least the processing unit which the indicating means indicates can accept data for processing. In addition, when the indicating means indicates that more than one of the processing units can accept data for input, the selecting means may select one of the processing units by arbitration. The selecting means also preferably has the function of writing the processing unit identification value to the recording means for the processing unit to which each command/data packet is assigned.

The recording means in accordance with a preferred embodiment of the invention preferably has a primary sequence FIFO to which the processing unit identification values are sequentially stored and an alternate sequence FIFO to which the processing unit identification values are sequentially stored for commands in which the processing is performed by more than one processing unit. During operation, the selecting means preferably writes an alternate flag to the primary sequence FIFO for commands in which the processing is to be performed by more than one processing unit, the alternate flag indicating that the processing unit identification values are to be written to the alternate sequence FIFO for each processing unit by which the command to be processed by more than one processing unit is processed. Then, a switch flag is written to the alternate sequence FIFO when all processing of the command to be processed by more than one processing unit is completed, the switch flag indicating that the processing unit identification values are now to be written to the primary sequence FIFO. As a result of this storage technique, the combining means may readily restore the original data sequence by sequentially reading the processing unit identification values from the primary sequence FIFO and reading processed data from an output of the processing unit corresponding to the read processing unit identification value until an alternate flag is read from the primary sequence FIFO, at which time the combining means sequentially reads the processing unit identification values from the alternate sequence FIFO and reads processed data from an output of the processing unit corresponding to the read processing unit identification value until a switch flag is read. This allows the original command sequencing to be retained without repeated synchronizing of the parallel processors and for a single instruction to be processed in parallel by a plurality of parallel processors.

The invention also encompasses a method for distributing a serial stream of data processing commands and associated data to one or more parallel data processing units for processing. This method in accordance with the invention generally includes the steps of:

providing the serial stream of data processing commands and associated data;

indicating whether any one of the one or more processing units can accept any input data for processing;

selecting, for each command in the serial stream of data processing commands and associated data, a processing unit as the processing unit for processing each respective command, the selected processing unit being a processing unit which can accept input data for processing; and recording a processing unit identification value indicating the processing unit by which each respective command is processed.

The method in accordance with the invention may also include the step of subsequently recombining the processed data into a serial processed data stream by sequentially reading an output of each of the processing units the original sequential an order as (specified by the respective recorded processing unit identification values.

The method in accordance with the invention is particularly characterized in that the recording step includes the steps of sequentially storing the processing unit identification values to a primary sequence FIFO and sequentially storing the processing unit identification values to an alternate sequence FIFO when the input command is one in which the processing is performed by more than one processing unit. The recording step in accordance with a preferred method of the invention also includes the steps of writing an alternate flag to the primary sequence FIFO for commands in which the processing is to be performed by more than one processing unit, where the alternate flag indicates that the processing unit identification values are to be written to the alternate sequence FIFO for each processing unit by which the command to be processed by more than one processing unit is processed, and writing a switch flag to the alternate sequence FIFO when all processing of the command to be processed by more than one processing unit is completed, where the switch flag indicates that the processing unit identification values are now to be written to the primary sequence FIFO. As a result of this processing sequence recording technique, the original data sequence may be reformed by sequentially reading the processing unit identification values from the primary sequence FIFO, reading processed data from an output of the processing unit corresponding to the read processing unit identification value until an alternate flag is read from the primary sequence FIFO, when the alternate flag is read sequentially reading the processing unit identification values from the alternate sequence FIFO, and reading processed data from an output of the processing unit corresponding to the read processing unit identification value until a switch flag is read.

Accordingly, the invention is preferably arranged so as to allow a sequential data stream such as pipelined graphics command/data packets to be distributed to a plurality of parallel processors without requiring repeated sychronization of the parallel processors for sequential commands. Moreover, since the invention operates upon the fundamental assumption that the sequence ordering all input command/data packets is to be maintained, improved flexibility in processing functions and improved processing speed are possible.

BRIEF DESCRIPTION OF THE DRAWINGS

The objects and advantages of the invention will become more apparent and more readily appreciated from the following detailed description of the presently preferred exemplary embodiments of the invention taken in conjunction with the accompanying drawings of which.

DETAILED DESCRIPTION OF THE PRESENTLY PREFERRED EMBODIMENTS

The inventors of the subject matter disclosed and claimed herein have satisfied the above-mentioned long-felt needs in the art by developing a hardware distributor for distributing serial instruction stream data to parallel processors and a method for the same by which improved data processing efficiency is achieved. In accordance with the invention, serial data streams are handed out to the processing units using a true "first come, first served" or "greedy" algorithm using fast bus arbitration hardware so that no complex processor is required to parse commands and implement load balancing algorithms. The invention also enables the entire command stream to be recombined in the proper order after processing even when a single command which requires considerable processing is executed in parallel by a plurality of the processors, with each portion of the result coming from a different processor.

A device with these and other beneficial features in accordance with presently preferred embodiments of the invention will be described with reference to FIGS. 1-5. A general description of the invention will first be made with reference to FIG. 1. Although the invention is described in conjunction with a host processing system and a graphics subsystem of the host system, where the serial data stream is made up of pipelined graphics commands and primitives, it will be appreciated by those of ordinary skill in the art that the principles of the invention may be applied in various other processing environments as well. Moreover, those skilled in the art will appreciate that the present description is for explanatory purposes only and is not intended in any way to limit the scope of the invention. All questions regarding the scope of the invention may be resolved by referring to the appended claims.

Figure 1:
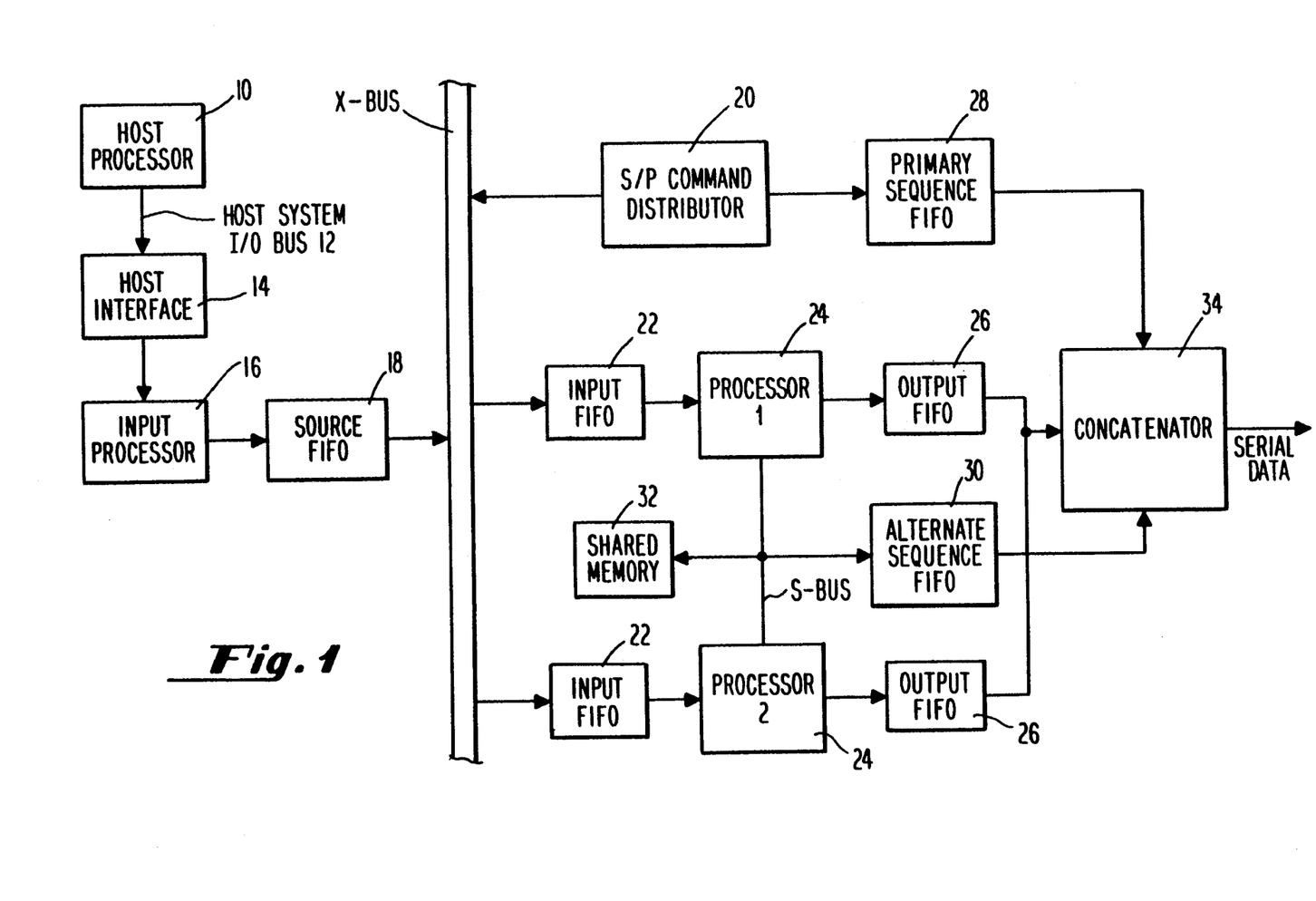
FIG. 1 schematically illustrates a hardware distributor for distributing serial instruction stream data to parallel processors in accordance with the invention.

FIG. 1 shows a host processing system interfaced with a parallel processing system in accordance with the invention. In particular, a host processor 10 generates a serial stream of data including, for example, a plurality of command/data packets including graphics commands and primitives, and outputs these command/data packets across the host system I/O bus 12 to host interface 14 before providing the command/data packets to input processor 16. A description of possible host interface devices may be found in copending U.S. patent application Ser. Nos. 07/492,518 filed Mar. 12, 1990, now abandoned and 07/494,008 filed Mar. 15, 1990, still pending, assigned to the assignee of this invention and hereby incorporated by reference. The input processor 16 may be, for example, a gate array which parses the incoming serial data stream and sets appropriate tags in the command/data packets so that the command/data packets may be distributed properly. The input processor 16 may also keep track of some rendering state variables for the graphics primitives. The processed command/data packets are then queued to the source FIFO 18. As will be described in detail below, the command/data packets are read from the source FIFO 18 and presented to the X-bus and the S/P command distributor 20 for distribution to the appropriate processor(s) for processing.

The X-bus connects the source FIFO 18 to the S/P command distributor 20 and to the queueing input FIFOs 22 associated with each of the processing units 24, which may be of any given number as desired by the designer. The S/P command distributor 20 controls when data is transferred from the source FIFO 18 to one or all of the input FIFOs 22 in accordance with the invention. Each input FIFO 22 holds the commands and data which its associated processor 24 must process until the processor 24 is ready for more input data. The data processed by each processor 24 is then outputted to its associated output FIFO 26 for storage until the data may be resequenced in accordance with the invention.

Each processor 24 in the system in accordance with the invention has a unique identification number which is known to the S/P command distributor 20. Thus, when a command/data packet which will cause some processing output is sent to one of the processing units 24, the identification number of that processing unit may be written into a primary sequence FIFO 28 in accordance with the invention so that the sequencing of input command/data packets may be maintained. As noted above, the present invention operates upon the assumption that all sequencing is to be maintained; therefore, it is important that an identification number be written to the primary sequence FIFO 28 for each instruction which causes output to be generated. The output of the primary sequence FIFO 28 is therefore a list of processing unit identification numbers identifying where each respective command/data packet was sent for execution. Accordingly, the output of the primary sequence FIFO 28 may be used to reconstruct the serial stream of commands after they have been operated on by the processing units 24.

The present invention also contains an alternate sequence FIFO 30 which is similar to primary sequence FIFO 28. As just noted, the order in which processors 24 are loaded with command/data packets is available from the primary sequence FIFO 28; however, this order must sometimes be interrupted, as when all processors 24 are asked to work on different portions of the same command. Alternate sequence FIFO 30 has been provided in accordance with the invention to handle such situations. In particular, when such a command is received, the S/P command distributor 20 can set a special flag (hereinafter referred to as an "alternate" flag) in the primary sequence FIFO 28 to alert the downstream hardware that the sequencing order is to be interrupted. This causes the downstream hardware to begin reading the new ordering from the alternate sequence FIFO 30. As will be described in more detail below, alternate sequence FIFO 30 will contain the ordering for the different pieces of the total result for the received command, and after the last processor 24 is finished with the last portion of the processing of the received command, it will insert a command or a flag (hereinafter referred to as a "switch" flag) into the alternate sequence FIFO 30 to alert the downstream hardware to switch back to the primary sequence FIFO 28 for sequencing. Processing of the command is typically shared by the processors 24 by communicating with a shared memory 32 across an S-bus for shared access to the data for processing.

Finally, the processing unit identification values stored in primary sequence FIFO 28 and alternate sequence FIFO 30 are used by concatenator 34 for recombining the processed data stored in output FIFOs 26 back into a serial data stream for further processing as will be described in more detail below.

The system in accordance with the invention is designed to handle at least four different types of input commands. In the context of a graphics system, these commands may be referred to as primitive commands, which include both world and device coordinate polygons and polylines and meshes, for example; primitive with hardware configuration commands; global commands; and global with hardware configuration commands.

These commands are assigned to a particular processing unit 24 by S/P command distributor 20 for processing in accordance with whether they are global commands to be processed by all processing units 24 or commands which may be processed by a single processor 24 or divided up for processing by several processors 24 as necessary. Such divisible commands are typically complex primitives such as B-spline commands, although any command which requires long processing time (and which may be divided) may be divided for processing in accordance with the invention.

Global commands have previously caused the most difficulty for sequencing purposes since such commands must always be executed by all processors 24. The sequential (not time) execution order of these commands must be maintained. On the other hand, commands with hardware configuration instructions are commands which change hardware configurations external to the processors 24. This external hardware may include frame buffer control registers, block mover and scan converter registers, and the like. Thus, for global with hardware configuration commands, special care must be taken since the hardware configuration portion of the command must only be executed once. Accordingly, such a command should be flagged such that the hardware configuration portion is only executed by a single processor 24.

Of course, other commands may be utilized by those skilled in the art in accordance with the invention. However, those commands should generally fall in the categories of those to be processed by a single processor and those to be processed by all processors. Moreover, those skilled in the art will appreciate that the hardware of the invention can be readily modified to accommodate other similar commands.

The general operation of the circuit of FIG. 1 will now be described. Initially, the input processor 16 reads each command/data packet in the serial input stream and determines whether it is an operation which can be performed by one of the processors or must be sent to all of them. Operations which must be sent to all graphics processors are flagged as globals by setting one of the bits in the first word of the command/data packet. Input processor 16 also checks to see if the packet is a divisible command type which will require use of the alternate sequence FIFO 30 as will be described in detail below. If so, another bit is set in the first word of the command/data packet. The input processor 16 may also set a bit in the last word of the command/data packet so that the S/P command distributor 20 can detect the end of the command/data packet. The command/data packet is then stored in source FIFO 18.

When one of the processors 24 needs more work to do, it attempts to read its input FIFO 22. If its input FIFO 22 is empty, the processor 24 will request more data. The S/P command distributor 20 will then arbitrate among the requesting processing units 24, if more than one requests more data, and automatically transfer the next command/data packet from the source FIFO 18 to the winning processor's input FIFO 22. If the command/data packet was flagged as a global, however, the packet will be written to all of the input FIFOs 22 when the first processor 24 requests more data.

At the time of transfer of the command/data packet to the winning processing unit 24, the S/P command distributor 20 also writes a word to the primary sequence FIFO 28. This word either indicates the number of the processing unit to which it has handed the command/data packet, or it indicates that the downstream hardware should begin using the output of the alternate sequence FIFO 30. However, it should be noted that certain types of global commands do not require any output from processing unit 24 to be sent down the pipeline. Hence, these commands do not require the S/P command distributor 20 to write an identification number into the primary sequence FIFO 28. Thus, only those commands which cause output to be generated by at least one processor 24 need be recorded in primary sequence FIFO 28.

On the other hand, when a complex divisible command such as the B-spline patch command mentioned above is received, such a command may be divided in accordance with the invention for processing by a plurality of processing units 24 as each processing unit 24 becomes available. The alternate sequence FIFO 30 will then keep track of the processing unit identification numbers to which the different portions of the command are processed by the processors 24.

In accordance with the invention, the S/P command distributor 20 may also have a feature which allows a processing unit 24 to make an "early request" for more work. Under software control, each processor can set a bit that alerts the S/P command distributor 20 that the processing unit 24 will soon be trying to read more work from its input FIFO 22. If the input FIFO 22 of the processor 24 is empty, the S/P command distributor 20 will know to transfer the next command/data packet from the source FIFO 18 to the processor 24 which makes the "early request" for more work. This aspect of the invention will be described in more detail below with respect to FIG. 3.

In sum, the S/P command distributor 20 in accordance with the invention is used when transferring commands and data to a parallel array of processing units 24, which may be of an arbitrary number. Most commands are sent to only one processing unit 24 at a time, where the particular processing unit 24 is decided by the availability of each processing unit 24, although global commands may be processed without losing sequentiality. The S/P command distributor 20 also preferably includes a decoder for determining type of command (i.e., a primitive, a global, or a B-spline or other complex divisible command) and when the end of the command has been reached. Based on this knowledge, the S/P command distributor 20 can determine whether to send a command to one or all of the processing units 24 and also know when to stop. Also, if the S/P command distributor 20 is to send a command to only one processing unit 24, it will sense the request lines for all processing units 24 and send the command to the processing unit 24 that is ready for the new command. If more than one processing unit 24 is available, the S/P command distributor 20 will break the tie by sending the command to the processing unit 24 which wins the arbitration (e.g., such as the processing unit 24 with the lowest requesting identification number). However, before a command is transferred to a processing unit 24, the identification number of the processing unit 24 is written to the primary sequence FIFO 28. Similarly, if the command is a global or B-spline, the identification number is written as if the command was not a global command. Then, in order for the processing units 24 to determine if they should generate an output, the S/P command distributor 20 may clear the global bit of all processing units 24 but the processing unit whose identification number was stored. That processing unit will then become the controlling processing unit 24 for purposes of output. Of course, other schemes are possible as would be apparent to one of ordinary skill in the art.

Figure 2:
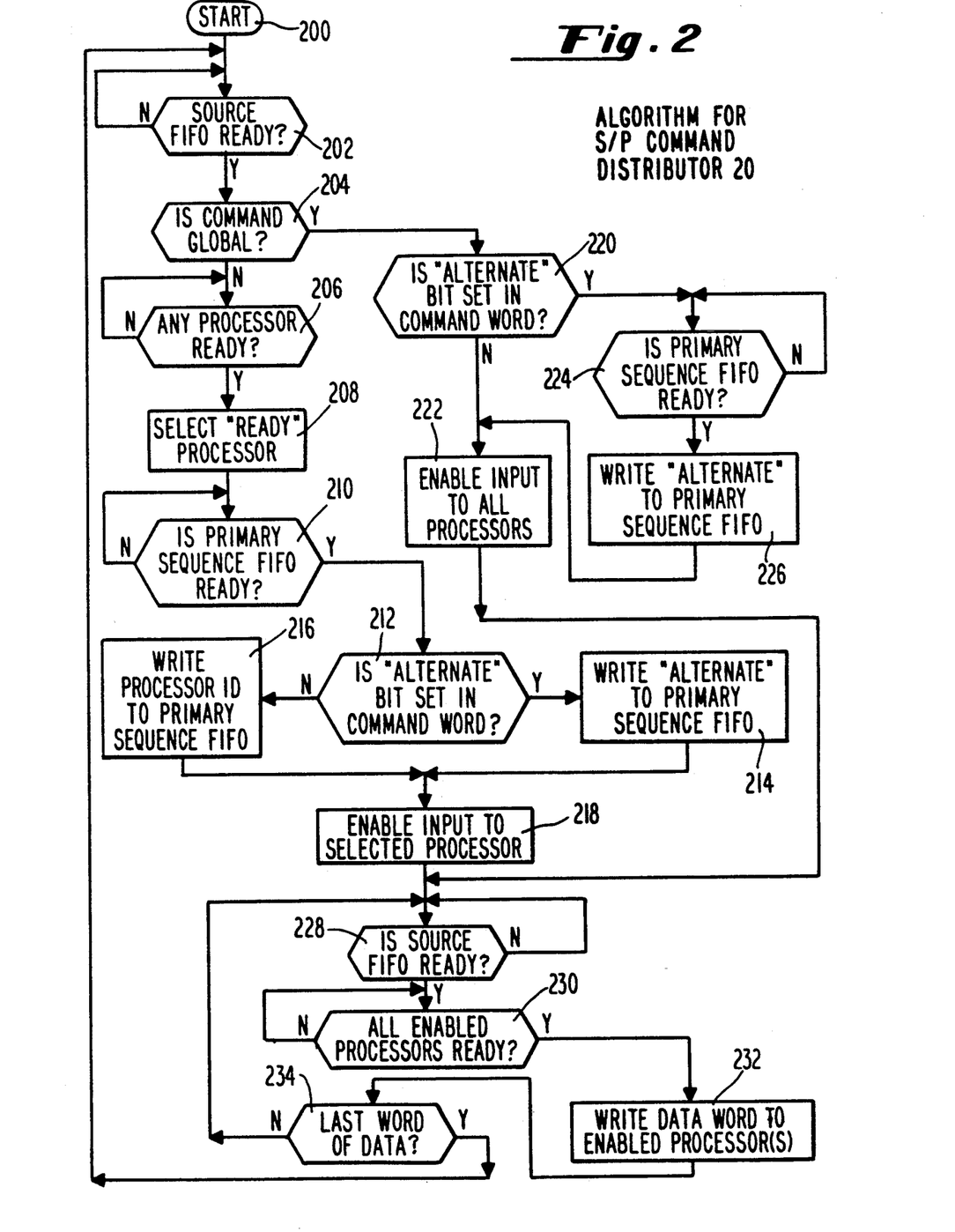
FIG. 2 illustrates an algorithm for operating the serial to parallel command distributor of FIG. 1 in accordance with the invention.

FIG. 2 illustrates a flow chart of the operation of S/P command distributor 20. Upon reset at step 200, the S/P command distributor 20 will check to see if it has work to do by examining the source FIFO 18 at step 202 to determine if the source FIFO 18 has command/data packets for processing. If so, the command bits of the command/data packets are checked to see if the command is a global command (step 204). If the command is not a global command, the S/P command distributor 20 waits until a processing unit 24 requests a command (step 206). Once a request is received, the S/P command distributor 20 will break any ties (if necessary) to select a "ready" processing unit at step 208. S/P command distributor 20 then checks at step 210 to see if the primary sequence FIFO 28 is free to receive data input, and if so, S/P command distributor 20 will write the number of the winning processing unit 24 to the primary sequence FIFO 28. (In general, the primary sequence FIFO 28 should always be ready to receive data and hence step 210 may be omitted.)

Before the processor identification number is written into the primary sequence FIFO 28, S/P command distributor 20 checks at step 212 to see if the "alternate" flag is set in the command word. As noted above, the "alternate" flag is set in the command word if the command may be processed by a plurality of processing units in parallel. If the "alternate" flag is set in the command word, the S/P command distributor 20 writes at step 214 an "alternate" flag to primary sequence FIFO 28. On the other hand, if the "alternate" flag is not set in the command word, only the processing unit identification value of the winning processing unit 24 is written to primary sequence FIFO 28 at step 216. Then, at step 218 S/P command distributor 20 enables the input line to the input FIFO 22 for the winning processing unit 24 so as to allow for transfer of the command in the source FIFO 18 to the selected processing unit 24.

On the other hand, if at step 204 it is determined that the command from the source FIFO 18 is a global command (note that a B-spline command may be treated as a global command), S/P command distributor 20 checks at step 220 to see if the "alternate" flag is set in the command word. If the "alternate" flag is not set in the command word, the input line to all input FIFOs 22 are enabled at step 222 so that the command from the source FIFO 18 may be broadcast to all processing units 24. However, if the "alternate" flag is set in the command word, the S/P command distributor 20 first checks at step 224 if the primary sequence FIFO 28 is ready and, if so, writes an "alternate" flag indicating that such a command has been received in primary sequence FIFO 28 at step 226.

Data transfer now begins by checking at step 228 whether the source FIFO 18 is ready for data transfer and at step 230 whether all enabled processors are ready for data input. When all elements are ready, data transfer begins at step 232 by writing the next data word in the source FIFO 18 to the enabled processing unit(s) input FIFO 22 until the last word of the command is transferred as determined at step 234. This process is repeated for each word in source FIFO 18, and the data transfer may be temporarily suspended if the source FIFO 18 becomes empty or if the destination input FIFO 22 becomes full. The S/P command distributor 20 senses these conditions and takes the necessary actions. Then, when the data transfer is completed, the S/P command distributor 20 loops back to check for a new command.

Figure 3:
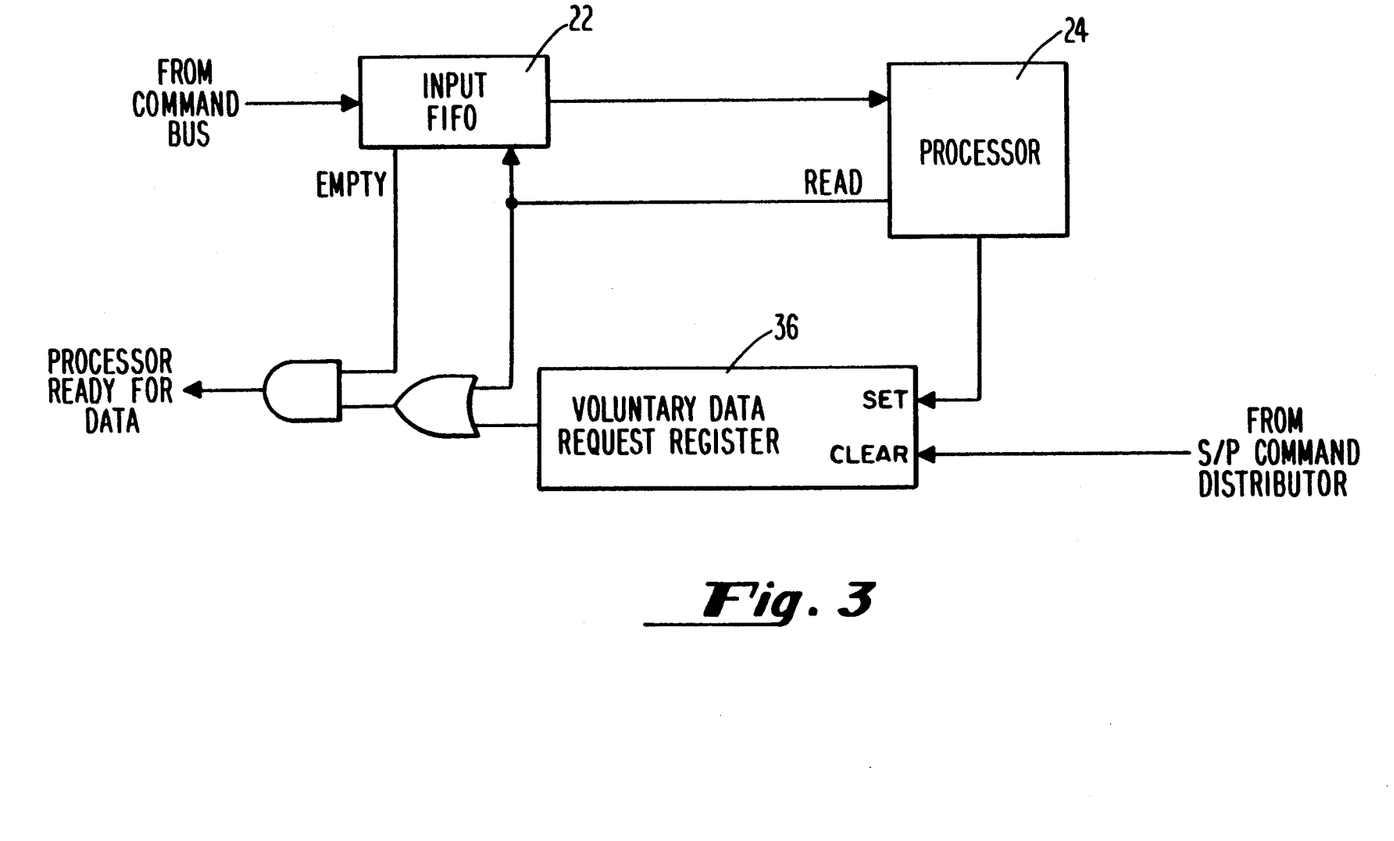
FIG. 3 schematically illustrates means by which each processor may indicate that it is ready for input data in accordance with the invention.

FIG. 3 shows a circuit in which each processing unit 24 may indicate that it is ready for more input data, as detected by S/P command distributor at step 206 (FIG. 2). In particular, the software of processing unit 24 may determine that it is soon to finish processing and accordingly set a SET bit in a voluntary data register 36. If this bit is set and input FIFO 22 is empty, a "processor ready" signal is sent to S/P command distributor 20 indicating that this processing unit 24 is ready for more data. When processing unit 24 is chosen, S/P command distributor 20 may then clear the voluntary data register. On the other hand, the processing unit may simply generate a read request to its input FIFO 22, and when such a read request is received at a time when the input FIFO 22 is empty, a "processor ready" signal may also be generated to indicate that the processing unit is ready for more data. Then, as noted above, S/P command distributor 20 may perform the necessary arbitration as necessary to determine whether the next input command/data packet is to be output to the requesting processing unit 24.

Figure 4:
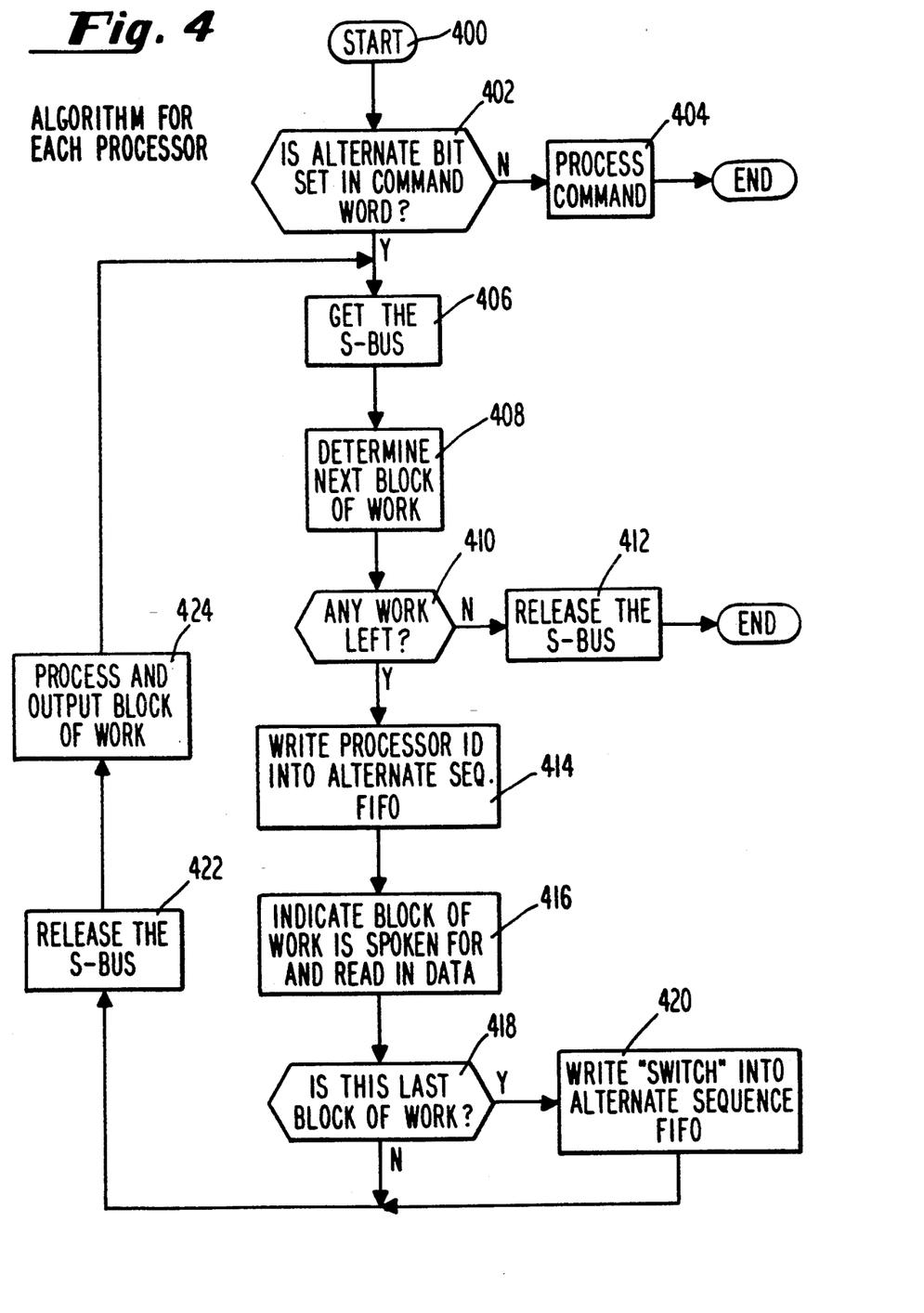
FIG. 4 illustrates an algorithm for use by each processor in processing a complex instruction in which processing thereof is shared with other processors.

FIG. 4 shows a flow chart of a portion of the process followed by each processing unit 24 when processing a command/data packet stored in its input FIFO 22. Generally, each processing unit 24 does not care whether the received command is a global or a primitive command. Rather, each processing unit 24 is primarily concerned with whether it is to perform all of the processing for the received command or whether that processing is to be shared with other processing units. As noted above, such is the case when an instruction such as a B-spline is received, where the command word has an "alternate" flag set to indicate that the instruction is an instruction which may be processed by a plurality of processing units. The processing unit must thus check to see what processing it is to perform.

Accordingly, after reading in a command/data packet from input FIFO 22, each processing unit 24 first checks the command word to determine if the "alternate" flag is set (step 402). If the "alternate" flag is not set, the command is an ordinary command which may be processed by that processing unit alone at step 404. However, if the "alternate" flag is set in the command word, the processing unit 24 gets the S-bus at step 406 and accesses shared memory 32 to determine what constitutes the next block of work (step 408). Preferably, the S-bus is a semaphored bus which may be accessed by only one processor at a time. Then, if it is determined that the processing of the command has completed (step 410), the S-bus is released at step 412 and the process ends. However, if further processing of the command in shared memory 32 remains, the processing unit with the S-bus semaphore writes its processing unit identification number into alternate sequence FIFO 30 at step 414 to indicate that it is performing a process on the data (e.g., the processing of several lines of data in an output display for a B-spline function). The processor 24 then indicates in shared memory 32 that the next block of work is spoken for and reads in the next block of data for processing at step 416. If this is the last block of work in processing the command, the processing unit 24 determines at step 418 that sequencing control must return back to primary sequence FIFO 28 and thus writes a "switch" flag into the alternate sequence FIFO 30 at step 420. Otherwise the processor 24 proceeds directly to step 422 to release the S-bus semaphore and to process the read in data at step 424, with the result being output to its output FIFO 26. The processing then leads back to the beginning so that the processing unit 24 can get the S-bus semaphore and determine whether there is any work left for processing. Processing continues among the processors in this manner until the shared instruction processing is completed. The values stored in the alternate sequence FIFO 30 may then be used in conjunction with the values stored in the primary sequence FIFO 28 to resequence the stream of data command words, as will now be described with respect to FIG. 5.

Figure 5:
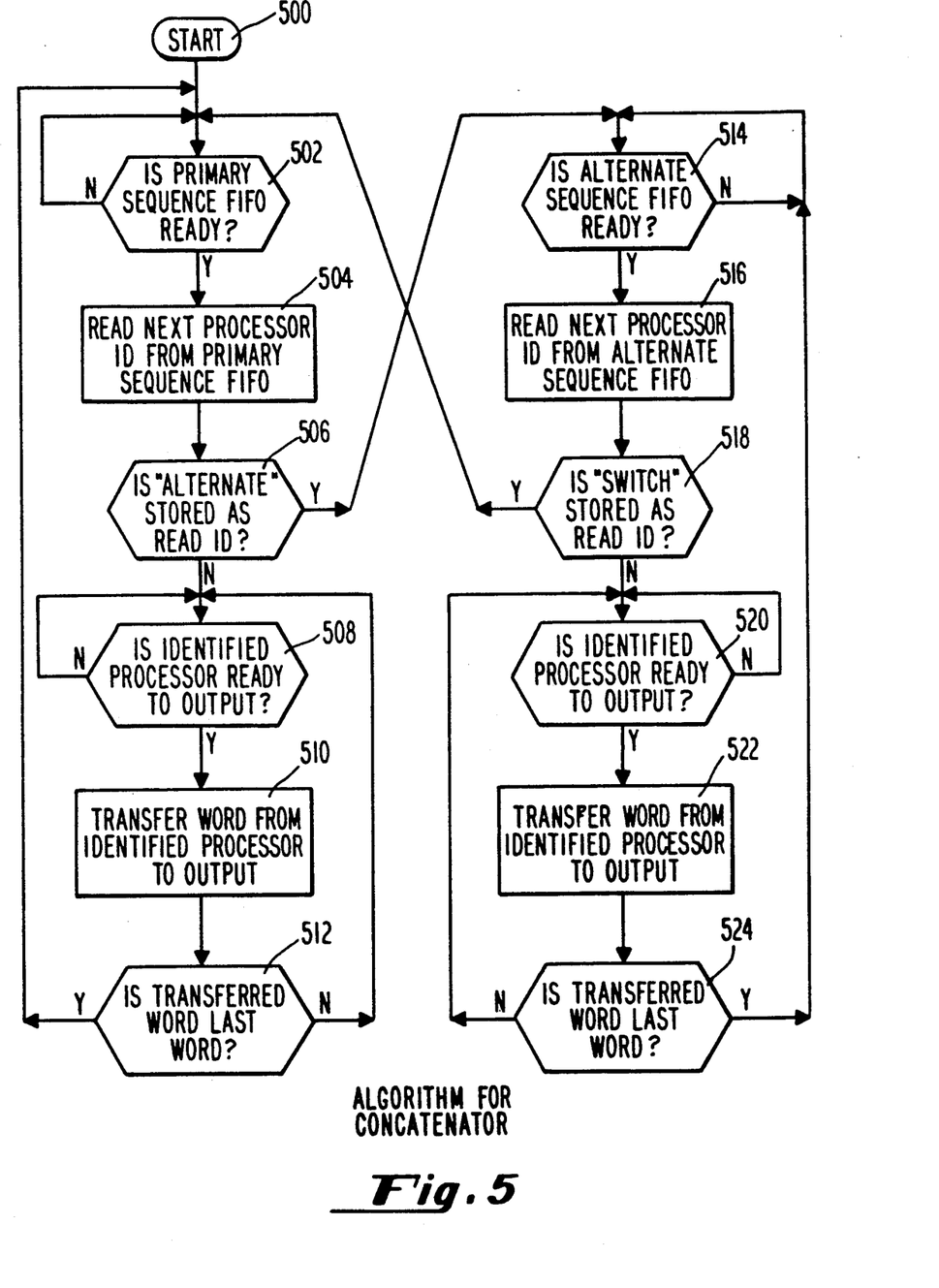
FIG. 5 illustrates an algorithm for operating the concatenator of FIG. 1 such that the processed data may be recombined into a serial processed data stream in accordance with the invention.

As shown in FIG. 5, concatenator 34 uses the outputs of the primary sequence FIFO 28 and alternate sequence FIFO 32 to resequence the outputs from the output FIFOs 26 into a serial data stream with the same ordering as the original. In particular, upon power up at step 500, concatenator 34 first checks at step 502 whether the primary sequence FIFO 28 is ready to read out data. Once the primary sequence FIFO 28 is ready to read out the stored processing unit identification data, the next processing unit identification value is read out at step 504. Concatenator 34 then checks whether the "alternate" flag has been stored as the read identification value (i.e., whether reading of alternate sequence FIFO 30 should now begin). If an "alternate" flag has not been stored, concatenator 34 checks at step 508 whether the output FIFO 26 of the identified processing unit is ready to output its processed data. When the output FIFO 26 is ready to output its data, the next word of data is output at step 510 as the next word in the output data sequence.

Concatenator 34 then checks at step 512 whether the transferred word was the last word, and if not, the same output FIFO 26 continues to output the processed data until all of the data for the particular command is output. The processing unit 24 then returns to the beginning to read in the next processing unit identification number from primary sequence FIFO 28 and processing is repeated.

However, in the case where an "alternate" flag is stored as a processing unit identification value in primary sequence FIFO 28, processing skips from step 506 to step 514, where the alternate sequence FIFO 30 is checked to determine whether it is ready to output its stored values. When alternate sequence FIFO 30 is ready to be read, the next processing unit identification value is read from alternate sequence FIFO at step 516. If it is determined at step 518 that a "switch" flag is stored as the processing unit identification value, concatenator 34 determines that it should read the next processing unit identification value from primary sequence FIFO 28. On the other hand, if a "switch" flag is not stored in the alternate sequence FIFO 30, concatenator 34 determines at step 520 whether the identified processor's output FIFO 26 is ready to output its data. Once the output FIFO 26 for the identified processing unit 24 is ready to output, the next word stored in the output FIFO 26 is transferred at step 522 as the next word in the data stream. Concatenator 34 then determines at step 524 whether this transfer of data is for the last word of processed data for the command, and if not, reads in the next word of data from the same output FIFO 26. Once the last word of processed data has been read, processing goes back to step 514, and when a "switch" flag is found in step 518 the primary sequence FIFO 28 read. In this manner, the processed data can be reconstructed in the same ordering in which the commands were originally distributed by S/P command distributor 20.

Other techniques may be implemented for different particular features of the invention, as would be apparent to those skilled in the art. For example, to determine whether to read the primary sequence FIFO 28 or the alternate sequence FIFO 30, concatenator 34 may constantly check a status bit of each of primary sequence FIFO 28 and the alternate sequence FIFO 30 to determine if one or the other is the FIFO which is to be read. The state of the status bit hence may be changed in lieu of using a "switch" flag or an "alternate" command or flag. In addition, a value may be stored in the primary sequence FIFO 28 to indicate that a global has been received, even if no output is required, so that the entire original sequencing order may be recreated. Also, should the global command require that processed data be sent downstream to the hardware for hardware updates, one processing unit identification value may be arbitrarily chosen in accordance with the above-described techniques so that the proper data may be sent downstream. In other words, the selected processing unit can send the hardware change commands downstream in the same manner as for any other command which causes output to be generated.

In addition, for those commands such as B-spline commands which in accordance with the invention may be processed in parallel by a plurality of processing units, flags may be used in shared memory 32 to indicate which block of data is next for processing. Thus, when a processing unit controls the S-bus and accesses shared memory 32 to determine which block of data is to be processed next, it may merely check a flag to determine which data block to process next. Also, when global commands are distributed by S/P command distributor 20 in accordance with the invention, the global commands may be transmitted immediately to all input FIFOs 22 unless one of the input FIFOs is full. In such a case, S/P command distributor 20 will only have to wait to distribute the global command until all of the input FIFOs 22 can accept the global command, rather than waiting until all input FIFOs are empty for purposes of synchronization. All such FIFOs used in accordance with the invention should have sufficient depth to buffer a reasonable number of global commands to ensure maximum performance. Moreover, since additional processing units may be easily added due to the independent operation of each processing unit, processing efficiency may be further maximized by allowing software complexity to be handled in parallel.

Although an exemplary embodiment of the invention has been described in detail above, those skilled in the art will readily appreciate that many additional modifications are possible in the exemplary embodiment without materially departing from the novel teachings and advantages of the invention. For example, the techniques described in accordance with the invention may be applied to substantially different types of commands in other processing environments rather than in a graphics system as herein described. The invention may be used in conjunction with any other processing system in which it is desirable for the sequencing order of a stream of commands applied to parallel processing units to be maintained without unnecessarily waiting for all of the processing units to be synchronized. Accordingly, all such modifications are intended to be included within the scope of this invention as defined in the following claims.

What is claimed is:

1. A device for distributing a serial stream of command/data packets for parallel processing in accordance with processing commands in said command/data packets, comprising:

substantially identical parallel data processing units for processing received command/data packets in accordance with processing commands in said received command/data packets;

input means for providing said serial stream of command/data packets for processing by said processing units;

means for indicating whether any one of said processing units is ready for a command/data packet for processing;

distributing means for selecting, for each respective sequential command from said serial stream of command/data packets which must be processed prior to a command in a subsequent command/data packet, at least one processing unit, which said indicating means indicates is ready for an input command/data packet, for processing a command/data packet having a sequential command, and distributing said command/data packet having said sequential command only to said at least one processing unit for processing asynchronously with the processing of other command/data packets by processing units other than said at least one processing unit; and means responsive to said distributing means for recording a processing unit identification value indicating the at least one processing unit by which each command/data packet having a sequential command is processed and maintaining said processing unit identification values as a record of the sequential order in which said command/data packets having said sequential commands were provided by said input means to said processing units for processing, and as a record of the sequential order in which said command/data packets are to be recombined after processing.

2. A device as in claim 1, further comprising means for combining processed data from said processing units into a serial processed data stream by sequentially reading outputs of each of said processing units in the sequential order specified by the processing unit identification values recorded in said recording means.

3. A device as in claim 2, wherein said serial stream of command/data packets comprises graphics commands and graphics primitives and said processing units comprise graphics processing units.

4. A device as in claim 3, further comprising an input first-in-first-out buffer (FIFO) associated with each processing unit for queuing command/data packets to be processed by the associated processing unit.

5. A device as in claim 4, wherein said indicating means generates a processor ready signal when a processing unit attempts to read in a command/data packet from its associated input FIFO but the associated input FIFO is substantially empty.

6. A device as in claim 4, wherein said indicating means generates a processor ready signal when a processing unit indicates that its processing is substantially completed and its associated input FIFO is substantially empty.

7. A device as in claim 3, wherein said input means comprises an input processor for setting a flag in each command/data packet identifying whether a command in that command/data packet is a sequential command, said sequential command being processed by said at least one processing unit, or a global command, said global command being processed in parallel by all of said processing units.

8. A device as in claim 7, wherein said input means further comprises a source first-in-first-out buffer (FIFO) for storing command/data packets output by said input processor until said command/data packets are distributed by said distributing means.

9. A device as in claim 8, wherein a sequential command in each command/data packet is one of a simple primitive command for processing by a single processing unit and a complex primitive command for processing by said at least one processing unit.

10. A device as in claim 9, wherein said distributing means determines whether a command of a next command/data packet in said source FIFO is a simple primitive, a complex primitive or a global command, a number of processing units by which the next command/data packet is to be processed and whether said indicating means indicates that any of said processing units is ready for an input command/data packet for processing, and said distributing means further enables input lines of only those processing units which said indicating means indicates is ready for data for processing.

11. A device as in claim 10, wherein when said indicating means indicates that more than one of said processing units is ready for an input command/data packet having a simple primitive command said distributing means selects one of the processing units by arbitration.

12. A device as in claim 11, wherein said distributing means writes a processing unit identification value to said recording means for the processing unit to which an input command/data packet containing a simple primitive command is assigned.

13. A device as in claim 12, wherein said recording means comprises a primary sequence first-in-first-out buffer (FIFO) to which said processing unit identification values are stored.

14. A device as in claim 13, wherein said recording means further comprises an alternate sequence first-in-first-out buffer (FIFO) to which the processing unit identification values are stored for input command/data packets having a complex primitive command in which the processing is performed by more tan one processing unit.

15. A device as in claim 14, wherein said distributing means writes an alternate flag to said primary sequence FIFO for input command/data packets having complex primitive commands in which the processing is to be performed by more than one processing unit, said alternate flag indicating that said processing unit identification values are to be written to said alternate sequence FIFO for each processing unit by which said input command/data packets having said complex primitive commands are processed.

16. A device as in claim 15, wherein a switch flag is written to said alternate sequence FIFO when all processing of an input command/data packet having a complex primitive command processed by more than one processing unit is completed, said switch flag indicating that processing unit identification values are to be written to said primary sequence FIFO for subsequent command/data packets.

17. A device as in claim 16, wherein said combining means reads said processing unit identification values from said primary sequence FIFO and reads processed data from an output of the processing unit corresponding to a processing unit identification value currently read from said primary sequence FIFO until an alternate flag is read from said primary sequence FIFO, at which time said combining means reads said processing unit identification values from said alternate sequence FIFO and reads processed data from an output of the processing unit corresponding to a processing unit identification value currently read from said alternate sequence FIFO until a switch flag is read from said alternate sequence FIFO, at which time said combining means again reads said processing unit identification values from said primary sequence FIFO.

18. A device for distributing a serial stream of command/data packets including graphics commands and graphics primitives for parallel processing, comprising:
substantially identical parallel graphics processing units for processing received command/data packets;
input first-in-first-out buffers (FIFOs) associated with each processing unit for queuing command/data packets to be processed by the associated processing unit;
input means for providing said serial stream of command/data packets for processing by said processing units;
means for indicating whether any one of said processing units is ready for a command/data packet for processing;
distributing means for selecting, for each respective sequential command from said serial stream of command/data packets which must be processed prior to a command in a subsequent command/data packet, at least one processing unit, which said indicating means indicates is ready for an input command/data packet, for processing a command/data packet having a sequential command, and distributing said command/data packet having said sequential command only to said at least one processing unit for processing asynchronously with the processing of other command/data packets by processing units other than said at least one processing unit; and
means responsive to said distributing means for recording a processing unit identification value indicating the at least one processing unit by which each command/data packet having a sequential command is processed and maintaining said processing unit identification values as a record of the sequential order in which said command/data packets having said sequential commands were provided by said input means to said processing units for processing, and as a record of the sequential order in which said command/data packets are to be recombined after processing 19. A device as in claim 18, further comprising means for combining processed data from said processing units into a pipelined graphics data stream by sequentially reading outputs of each of said processing units in the sequential order specified by the processing units identification values recorded in said recording means.

20. A device as in claim 19, wherein said indicating means generates a processor ready signal when a processing unit attempts to read in a command/data packet from its associated input FIFO but the associated input FIFO is substantially empty.

21. A device as in claim 19, wherein said indicating means generates a processor ready signal when a processing unit indicates that its processing is substantially completed and its associated input FIFO is substantially empty.

22. A device for distributing a serial stream of command/data packets including graphics commands and graphics primitives for parallel processing, comprising:
substantially identical parallel graphics processing units for processing received command/data packets;
input first-in-first-out buffers (FIFOs) associated with each processing unit for queuing command/data packets to be processed by the associated processing unit;
an input processor for setting a flag in each command/data packet identifying whether a command in that command/data packet is a sequential command, said sequential command being processed by said at least one processing unit, or a global command, said global command being processed in parallel by all of said processing units, said input processor including a source first-in-first-out buffer (FIFO) for storing input command/data packets from said serial stream of command/data packets for provision to said processing units for processing;
means for indicating whether any one of said processing units is ready for a command/data packet for processing;
distributing means for selecting, for each respective sequential command from said serial stream of command/data packets which must be processed prior to a command in a subsequent command/data packet, at least one processing unit, which said indicating means indicates is ready for an input command/data packet, for processing a command/data packet having a sequential command, and distributing said command/data packet having said sequential command only to said at least one processing unit for processing asynchronously with the processing of other command/data packets by processing units other than said at least one processing unit; and means responsive to said distributing means for recording a processing unit identification value indicating the at least one processing unit by which each command/data packet having a sequential command is processed and maintaining said processing unit identification values as a record of the sequential order in which said command/data packets having said sequential commands were provided by said input means to said processing units for processing, and as a record of the sequential order in which said command/data packets are to be recombined after processing.

23. A device as in claim 22, further comprising means for combining processed data from said processing units into a pipelined graphics data stream by sequentially reading outputs of each of said processing units in the sequential order specified by the processing unit identification values recorded in said recording means.

24. A device as in claim 23, wherein a sequential command in each command/data packet is one of a simple primitive command for processing by a single processing unit and a complex primitive command for processing by said at least one processing unit, and said distributing means determines whether a command of a next command/data packet in said source FIFO is a simple primitive, a complex primitive or a global command, a number of processing units by which the next command/data packet is to be processed and whether said indicating means indicates that any of said processing units is ready for an input command/data packet for processing, said distributing means further enabling input lines of only those processing units which said indicating means indicates is ready for data for processing.

25. A device as in claim 24, wherein when said indicating means indicates that more than one of said processing units is ready for an input command/data packet having a simple primitive command said distributing means selects one of the processing units by arbitration.

26. A device as in claim 25, wherein said distributing means writes a processing unit identification value to said recording means for the processing unit to which an input command/data packet containing a simple primitive command is assigned.

27. A device as in claim 26, wherein said recording means comprises a primary sequence first-in-first-out buffer (FIFO) to which said processing unit identification values are stored.

28. A device as in claim 27, wherein said recording means further comprises an alternate sequence first-in-first-out buffer (FIFO) to which the processing unit identification values are stored for input command/data packets having a complex primitive command in which the processing is performed by more than one processing unit.

29. A device as in claim 28, wherein said distributing means writes an alternate flag to said primary sequence FIFO for input command/data packets having complex primitive commands in which the processing is to be performed by more than one processing unit, said alternate flag indicating that said processing unit identification values are to be written to said alternate sequence FIFO for each processing unit by which said input command/data packets having said complex primitive commands are processed.

30. A device as in claim 29, wherein a switch flag is written to said alternate sequence FIFO when all processing of an input command/data packet having a complex primitive command processed by more than one processing unit is completed, said switch flag indicating that processing unit identification values are to be written to said primary sequence FIFO for subsequent command/data packets.

31. A device as in claim 30, wherein said combining means reads said processing unit identification values from said primary sequence FIFO and reads processed data from an output of the processing unit corresponding to a processing unit identification value currently read from said primary sequence FIFO until an alternate flag is read from said primary sequence FIFO, at which time said combining means reads said processing unit identification values from said alternate sequence FIFO and reads processed data from an output of the processing unit corresponding to a processing unit identification value currently read from said alternate sequence FIFO until a switch flag is read from said alternate sequence FIFO, at which time said combining means again reads said processing unit identification values from said primary sequence FIFO.

32. A method for distributing a serial stream of command/data packets for parallel processing in accordance with processing commands in said command/data packets, comprising:

indicating whether substantially identical parallel data processing units are ready for an input command/data packet for processing;

selecting, for each respective sequential command from said serial stream of command/data packets which must be processed prior to a command in a subsequent command/data packet, at least one processing unit, which has been found in said indicating step to be ready for an input command/data packet, for processing a command/data packet having a sequential command;

distributing said command/data packet having said sequential command only to said at least one processing unit for processing asynchronously with the processing of other command/data packets by processing units other than said at least one processing unit;

processing received command/data packets in said at least one processing unit in accordance with processing commands in said received command/data packets; and recording a processing unit identification value indicating the at least one processing unit by which each command/data packet having a sequential command is processed so as to maintain a record of the sequential order in which said command/data packets having said sequential commands were provided to said processing units for processing, and as a record of the sequential order in which said command/data packets are to be recombined after processing.

33. A method as in claim 32, comprising the further step of combining processed data from said processing units into a serial processed data stream by sequentially reading outputs of each of said processing units in the sequential order specified by the recorded processing unit identification values.

34. A method as in claim 33, wherein said indicating step includes the step of generating a processor ready signal when a processing unit attempts to read in a command/data packet from its input buffer but its input buffer is substantially empty.

35. A method as in claim 33, wherein said indicating step includes the step of generating a processor ready signal when a processing unit indicates that its processing is substantially completed and its input buffer is substantially empty.

36. A method as in claim 33, comprising the further step of setting a flag in each command/data packet identifying whether a command in that command/data packet is a sequential command, said sequential command being processed by said at least one processing unit, or a global command, said global command being processed in parallel by all of said processing units.

37. A method as in claim 36, wherein said selecting step includes the steps of determining whether a command of a next command/data packet is a sequential command which is one of a simple primitive command for processing by a single processing unit or a complex primitive command for processing by said at least one processing unit, or is a global command, determining a number of processing units by which the next command/data packet is to be processed, and enabling input lines of only those processing units which have been found in said indicating step to be ready for data for processing.

38. A method as in claim 37, wherein said selecting step includes the further step of arbitrating among the processing units when more than one of said processing units is ready for an input command/data packet having a simple primitive command for processing when determining which processing unit to select for processing the input command/data packet.

39. A method as in claim 38, wherein said recording step comprises the step of storing said processing unit identification values in a primary sequence first-in-first-out buffer (FIFO).

40. A method as in claim 39, wherein said recording step comprises the step of storing said processing unit identification values in an alternate sequence first-in-first-out buffer (FIFO) for input command/data packets having a complex primitive command in which the processing is performed by more than one processing unit.

41. A method as in claim 40, wherein said recording step includes the step of writing an alternate flag to said primary sequence FIFO for input command/data packets having complex primitive commands in which the processing is to be performed by more than one processing unit, said alternate flag indicating that said processing unit identification values are to be written to said alternate sequence FIFO for each processing unit by which said input command/data packets having said complex primitive commands are processed.

42. A method as in claim 41, wherein said recording step includes the further step of writing a switch flag to said alternate sequence FIFO when all processing of an input command/data packet having a complex primitive command processed by more than one processing unit is completed, said switch flag indicating that processing unit identification values are to be written to said primary sequence FIFO for subsequent command/data packets.

43. A method as in claim 42, wherein said combining step includes the steps of reading said processing unit identification values from said primary sequence FIFO, reading processed data from an output of the processing unit corresponding to a processing unit identification value currently read from said primary sequence FIFO until an alternate flag is read from said primary sequence FIFO, and when said alternate flag is read, reading said processing unit identification values from said alternate sequence FIFO and reading processed data from an output of the processing unit corresponding to a processing unit identification value currently read from said alternate sequence FIFO until a switch flag is read from said alternate sequence FIFO, and when said switch flag is read, again reading said processing unit identification values from said primary sequence FIFO.

44. A method as in claim 43, wherein processing of said input command/data packets having said complex primitive commands for processing by more than one processing unit includes the steps of instructing one processing unit to repeatedly access a memory space shared by all processing units to perform a portion of the processing of said input command/data packet having said complex primitive command for processing by more than one processing unit until another processing unit which is to process said input command/data packet having said complex primitive command for processing by more than one processing unit accesses said shared memory space between accesses to said shared memory space by said one processing unit.

45. A method for distributing a serial stream of command/data packets including graphics commands and graphics primitives for parallel processing, comprising:
indicating whether substantially identical parallel data processing units are ready for an input command/data packet for processing;
selecting, for each respective sequential command from said serial stream of command/data packets which must be processed prior to a command in a subsequent command/data packet, at least one processing unit, which has been found in said indicating step to be ready for an input command/data packet, for processing a command/data packet having a sequential command;
distributing said command/data packet having said sequential command only to said at least one processing unit for processing asynchronously with the processing of other command/data packets by processing units other than said at least one processing unit;
processing received command/data packets in said at least one processing unit in accordance with processing commands in said received command/data packets; and
recording a processing unit identification value indicating the at least one processing unit by which each command/data packet having a sequential command is processed so as to maintain a record of the sequential order in which said command/data packets having said sequential commands were provided to said processing units for processing, and as a record of the sequential order in which said command/data packets are to be recombined after processing 46. A method as in claim 45, comprising the further step of combining processed data from said processing units into a pipelined graphics data stream by sequentially reading outputs of each of said processing units in the sequential order specified by the recorded processing unit identification values.

47. A method as in claim 46, wherein said indicating step includes the step of generating a processor ready signal when a processing unit attempts to read in a command/data packet from its input buffer but its input buffer is substantially empty.

48. A method as in claim 47, wherein said indicating step includes the step of generating a processor ready signal when a processing unit indicates that its processing is substantially completed and its input buffer is substantially empty.

49. A method as in claim 46, comprising the further step of setting a flag in each command/data packet identifying whether a command in that command/data packet is a sequential command, said sequential command being processed by said at least one processing unit, or a global command, said global command being processed in parallel by all of said processing units.

50. A method as in claim 49, wherein said selecting step includes the steps of determining whether a command of a next command/data packet is a sequential command which is one of a simple primitive command for processing by a single processing unit or a complex primitive command for processing by said at least one processing unit, or is a global command, determining a number of processing units by which the next command/data packet is to be processed, and enabling input lines of only those processing units which have been found in said indicating step to be ready for data for processing.

51. A method as in claim 50, wherein said selecting step includes the further step of arbitrating among the processing units when more than one of said processing units is ready for an input command/data packet having a simple primitive command for processing when determining which processing unit to select for processing the input command/data packet.

52. A method as in claim 51, wherein said recording step comprises the step of storing said processing unit identification values in a primary sequence first-in-first-out buffer (FIFO).

53. A method as in claim 52, wherein said recording step comprises the step of storing said processing unit identification values in an alternate sequence first-in-first-out buffer (FIFO) for input command/data packets having a complex primitive command in which the processing is performed by more than one processing unit.

54. A method as in claim 53, wherein said recording step includes the step of writing an alternate flag to said primary sequence FIFO for input command/data packets having complex primitive commands in which the processing is to be performed by more than one processing unit, said alternate flag indicating that said processing unit identification values are to be written to said alternate sequence FIFO for each processing unit by which said input command/data packets having said complex primitive commands are processed.

55. A method as in claim 54, wherein said recording step includes the further step of writing a switch flag to said alternate sequence FIFO when all processing of an input command/data packet having a complex primitive command processed by more than one processing unit is completed, said switch flag indicating that processing unit identification values are to be written to said primary sequence FIFO for subsequent command/data packets.

56. A method as in claim 55, wherein said combining step includes the steps of reading said processing unit identification values from said primary sequence FIFO, reading processed data from an output of the processing unit corresponding to a processing unit identification value currently read from said primary sequence FIFO until an alternate flag is read from said primary sequence FIFO, and when said alternate flag is read, reading said processing unit identification values from said alternate sequence FIFO and reading processed data from an output of the processing unit corresponding to a processing unit identification value currently read from said alternate sequence FIFO until a switch flag is read from said alternate sequence FIFO, and when said switch flag is read, again reading said processing unit identification values from said primary sequence FIFO.

57. A method as in claim 56, wherein processing of said input command/data packets having said complex primitive commands for processing by more than one processing unit includes the steps of instructing one processing unit to repeatedly access a memory space shared by all processing units to perform a portion of the processing of said input command/data packet having said complex primitive command for processing by more than one processing unit until another processing unit which is to process said input command/data packet having said complex primitive command for processing by more than one processing unit accesses said shared memory space between accesses to said shared memory space by said one processing unit.

* * * * *